(12) United States Patent
Dickens

(10) Patent No.: US 11,850,192 B2
(45) Date of Patent: Dec. 26, 2023

(54) THREE WHEELED HEARSE ASSEMBLY

(71) Applicant: Donald Dickens, Goodman, MS (US)

(72) Inventor: Donald Dickens, Goodman, MS (US)

( * ) Notice: Subject to any disclaimer, the term of this patent is extended or adjusted under 35 U.S.C. 154(b) by 642 days.

(21) Appl. No.: 17/076,516

(22) Filed: Oct. 21, 2020

(65) Prior Publication Data

US 2022/0117821 A1 Apr. 21, 2022

(51) Int. Cl.

| | | |
|---|---|---|
| *A61G 21/00* | (2006.01) | |
| *B62K 5/027* | (2013.01) | |
| *B62K 7/04* | (2006.01) | |
| B62K 27/04 | (2006.01) | |
| B62K 19/30 | (2006.01) | |
| B62K 21/12 | (2006.01) | |
| B62M 7/12 | (2006.01) | |
| B62L 3/04 | (2006.01) | |
| B62J 37/00 | (2006.01) | |
| B62J 43/30 | (2020.01) | |
| B62J 43/28 | (2020.01) | |
| B62M 1/24 | (2013.01) | |
| B62L 3/02 | (2006.01) | |
| B62J 35/00 | (2006.01) | |

(52) U.S. Cl.
CPC .............. *A61G 21/00* (2013.01); *B62K 5/027* (2013.01); *B62K 7/04* (2013.01); *B62J 35/00* (2013.01); *B62J 37/00* (2013.01); *B62J 43/28* (2020.02); *B62J 43/30* (2020.02); *B62K 19/30* (2013.01); *B62K 21/12* (2013.01); *B62K 27/04* (2013.01); *B62L 3/02* (2013.01); *B62L 3/04* (2013.01); *B62M 1/24* (2013.01); *B62M 7/12* (2013.01)

(58) Field of Classification Search
CPC ......... A61G 21/00; B62K 5/027; B62K 27/04
USPC ...................................................... 296/16, 18
See application file for complete search history.

(56) References Cited

U.S. PATENT DOCUMENTS

| | | | |
|---|---|---|---|
| 3,840,085 A | 10/1974 | Smith | |
| 4,580,652 A | 4/1986 | Turner | |
| 6,945,376 B1 * | 9/2005 | Hunter | B62K 23/08 |
| | | | 192/114 R |
| 7,213,855 B2 * | 5/2007 | Larson | B62K 5/01 |
| | | | 180/24.04 |
| D545,724 S * | 7/2007 | Price | D12/109 |
| 7,316,437 B2 | 1/2008 | Sinclair | |
| D686,112 S * | 7/2013 | Cruz | D12/110 |
| 9,284,011 B2 * | 3/2016 | Aguilar | F16D 23/12 |
| D783,505 S | 4/2017 | Neal | |
| 10,024,278 B2 * | 7/2018 | Mizuta | B60Q 1/0408 |
| 2009/0174205 A1 * | 7/2009 | Kim | A61G 21/00 |
| | | | 296/16 |
| 2022/0117821 A1 * | 4/2022 | Dickens | B62K 5/027 |

* cited by examiner

*Primary Examiner* — Jason S Morrow

(57) ABSTRACT

A three wheeled hearse assembly for transporting a motorcyclist's casket includes a rolling chassis, which in turn comprises a front wheel and a pair of rear wheels. A frame is engaged to the rolling chassis between the front wheel and the rear wheels. A casket can be positioned in the frame so that the casket is engaged to the rolling chassis. A seat is engaged to the rolling chassis proximate to the front wheel. A handlebar is engaged to the rolling chassis proximate to the front wheel and is operationally engaged thereto. The handlebar is can be grasped in hands of a driver positioned on the seat, positioning the driver to selectively turn the front wheel to steer the rolling chassis.

10 Claims, 5 Drawing Sheets

THREE WHEELED HEARSE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to hearse assemblies and more particularly pertains to a new hearse assembly for transporting a motorcyclist's casket.

(2) Description of Related Art Including Information Disclosed Under 37 CFR 1.97 and 1.98

The prior art relates to hearse assemblies. The prior art comprises sidecars and trailers configured to carry a casket and which are engageable to motorcycles. What is lacking in the prior art is a hearse assembly built on a three wheeled chassis.

BRIEF SUMMARY OF THE INVENTION

An embodiment of the disclosure meets the needs presented above by generally comprising a rolling chassis, which in turn comprises a front wheel and a pair of rear wheels. A frame is engaged to the rolling chassis between the front wheel and the rear wheels and is configured to have positioned therein a casket so that the casket is engaged to the rolling chassis. A seat is engaged to the rolling chassis proximate to the front wheel and is configured to seat a driver. A handlebar is engaged to the rolling chassis proximate to the front wheel and is operationally engaged thereto. The handlebar is configured to be grasped in hands of the driver, positioning the driver to selectively turn the front wheel to steer the rolling chassis.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
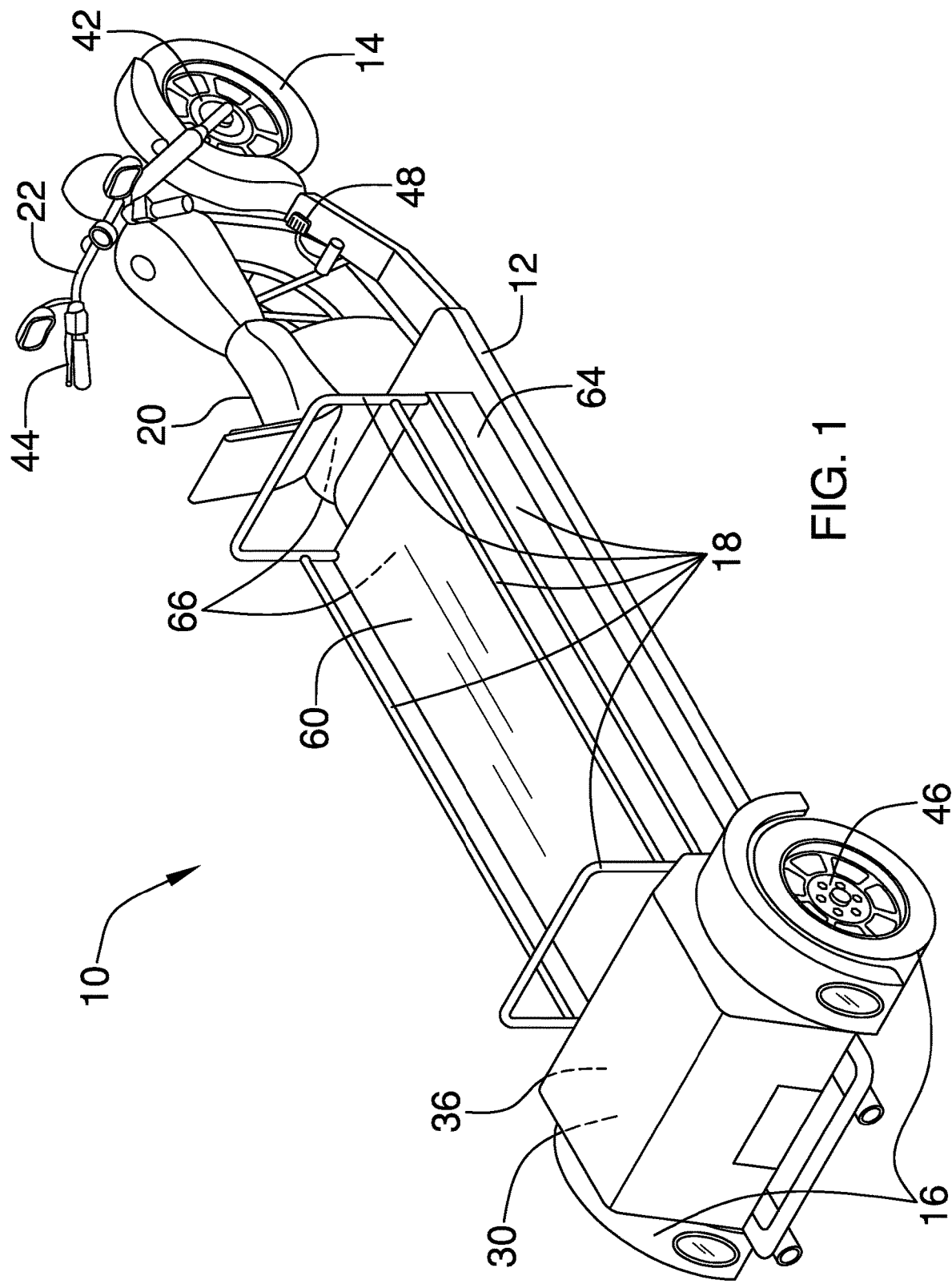
FIG. 1 is an isometric perspective view of a three wheeled hearse assembly according to an embodiment of the disclosure.
Figure 2:
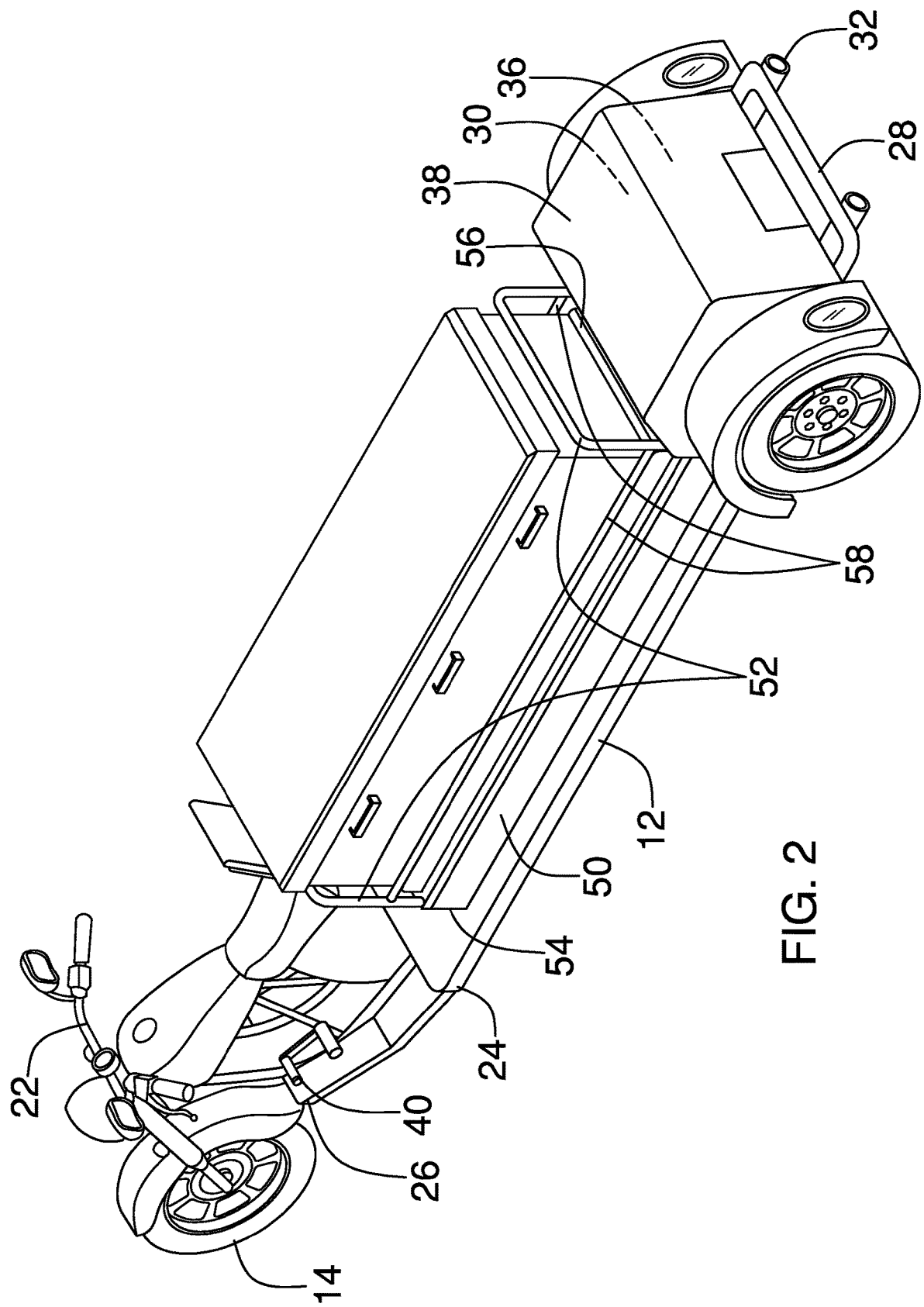
FIG. 2 is an in-use view of an embodiment of the disclosure.
Figure 3:
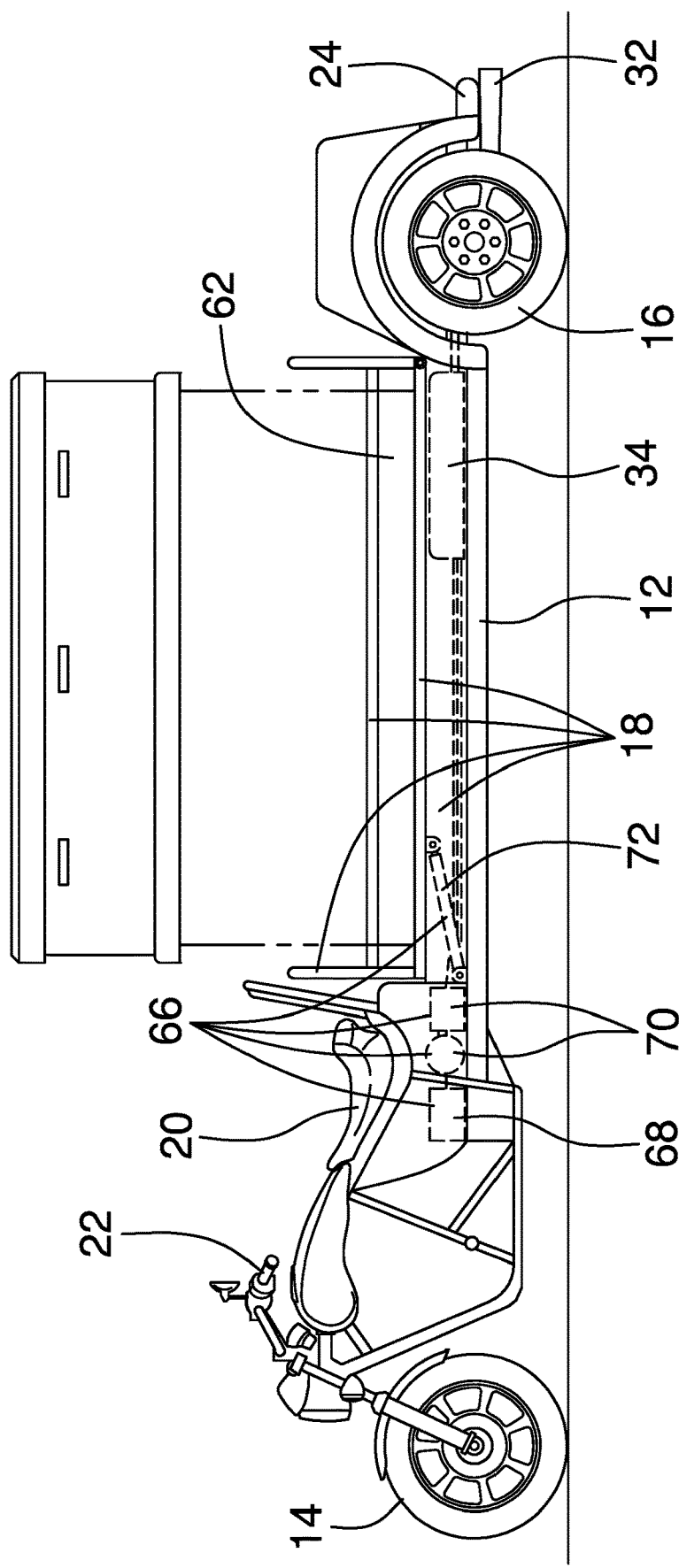
FIG. 3 is a side view of an embodiment of the disclosure.
Figure 4:
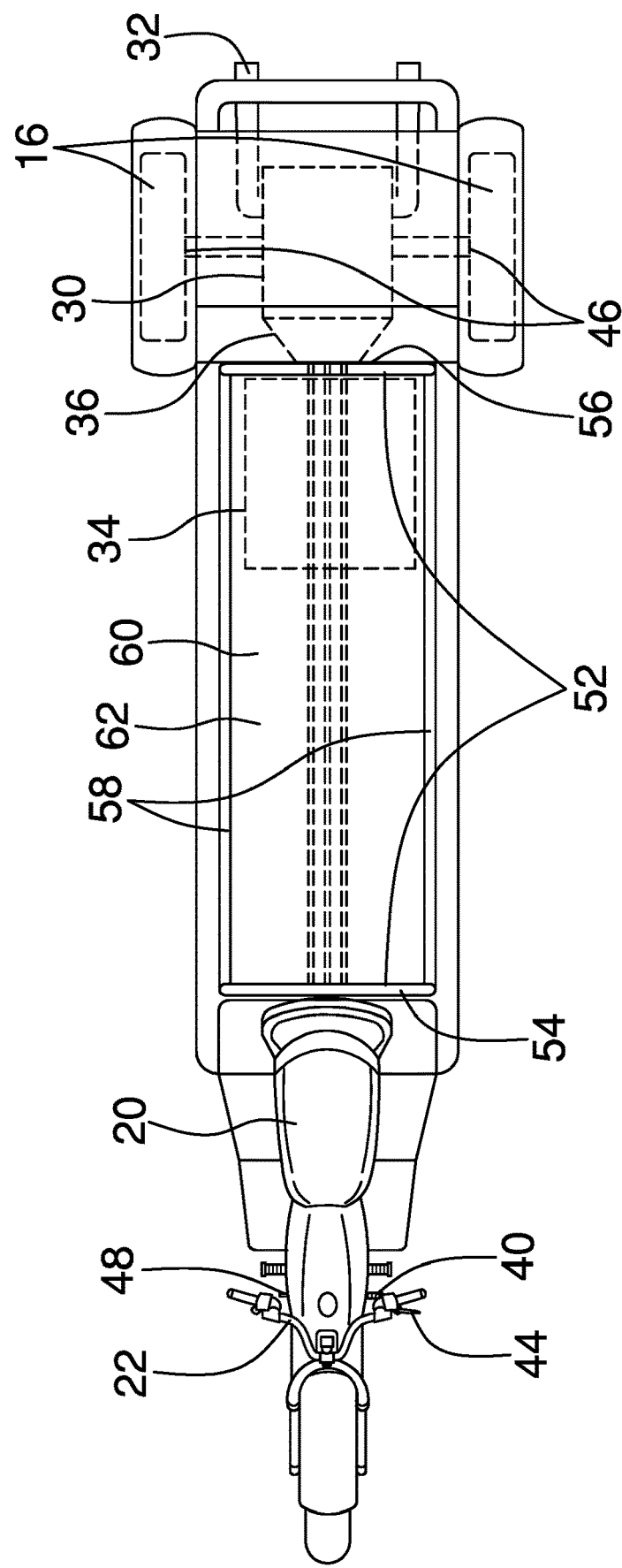
FIG. 4 is a top view of an embodiment of the disclosure.
Figure 5:
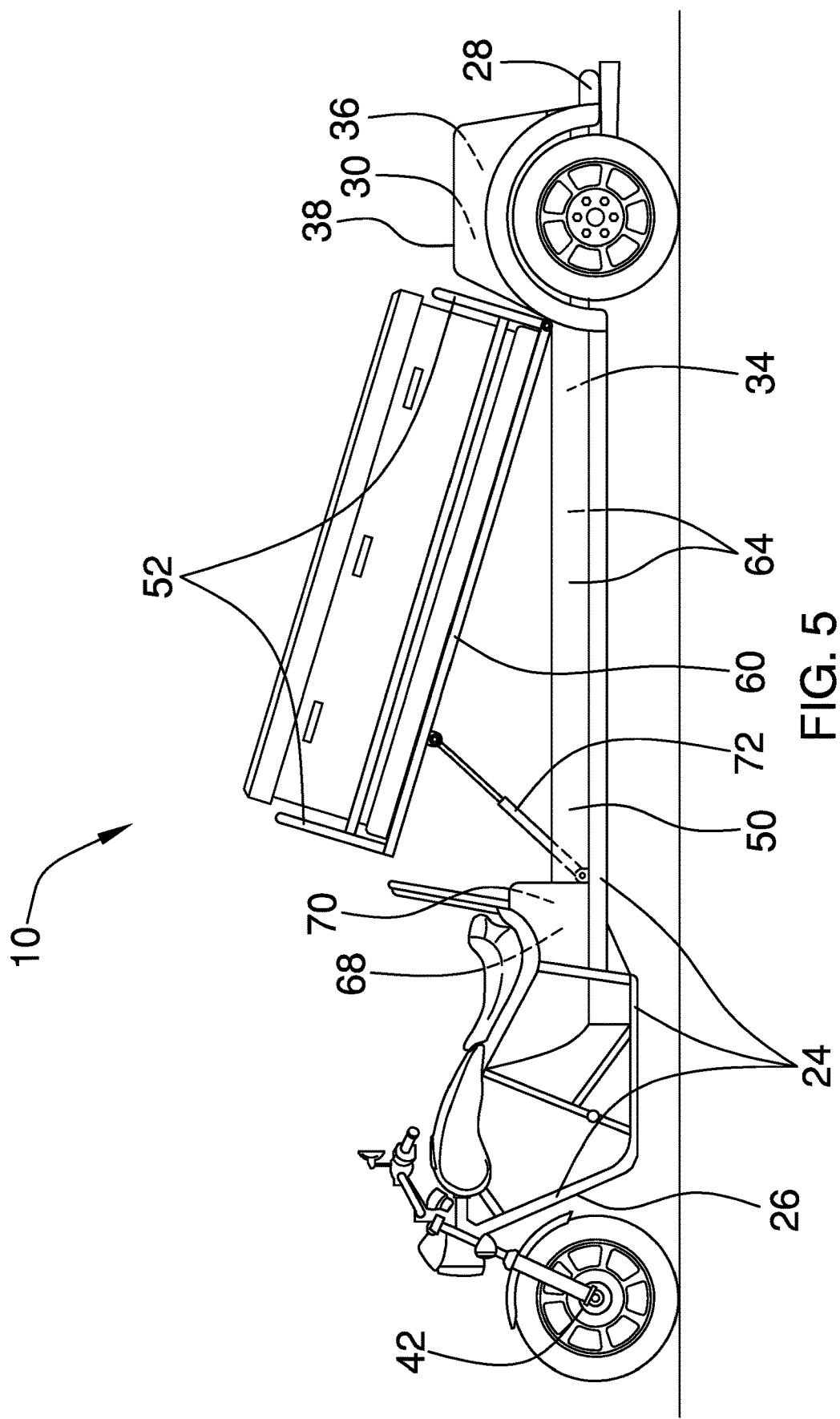
FIG. 5 is an in-use view of an embodiment of the disclosure.

With reference now to the drawings, and in particular to FIGS. 1 through 5 thereof, a new hearse assembly embodying the principles and concepts of an embodiment of the disclosure and generally designated by the reference numeral 10 will be described.

As best illustrated in FIGS. 1 through 5, the three wheeled hearse assembly 10 generally comprises a rolling chassis 12, which in turn comprises a front wheel 14 and a pair of rear wheels 16. A frame 18 is engaged to the rolling chassis 12 between the front wheel 14 and the rear wheels 16 and is configured to have positioned therein a casket so that the casket is engaged to the rolling chassis 12. A seat 20 is engaged to the rolling chassis 12 proximate to the front wheel 14 and is configured to seat a driver. A handlebar 22 is engaged to the rolling chassis 12 proximate to the front wheel 14 and is operationally engaged thereto. The handlebar 22 is configured to be grasped in hands of the driver, positioning the driver to selectively turn the front wheel 14 to steer the rolling chassis 12

The rolling chassis 12 comprises a framework 24, which has engaged to a front end 26 thereof the front wheel 14 and to a rear end 28 thereof the rear wheels 16. A motor 30 is engaged to the framework 24 and is operationally engaged to the rear wheels 16. An exhaust pipe 32 is engaged to the motor 30 and extends toward the rear end 28 of the framework 24. A gas tank 34 is engaged to the framework 24 and is operationally engaged to the motor 30 so that the gas tank 34 is positioned to fuel the motor 30.

The rolling chassis 12 also comprise a transmission 36, which is engaged to the framework 24 and is operationally engaged to the motor 30 and the rear wheels 16. The transmission 36 and the motor 30 are positioned within a housing 38, which is engaged to the framework 24 and positioned between the rear wheels 16. The transmission 36 is positioned to effect speed and torque conversion between the motor 30 and the rear wheels 16. A clutch pedal 40 is engaged to the rolling chassis 12 proximate to the handlebar 22 and is operationally engaged to the transmission 36. The clutch pedal 40 is configured to be selectively manipulated by a respective foot of the driver to actuate the transmission 36.

A front brake 42 is engaged to the front wheel 14 and is operationally engaged to a brake lever 44, which is engaged to the handlebar 22. The brake lever 44 is configured to be levered by clutching of the handlebar 22 and the brake lever 44 in a respective hand of the driver to actuate the front brake 42 to slow the rolling chassis 12.

A pair of rear brakes 46 is engaged singly to the rear wheels 16 and is operationally engaged to a brake pedal 48, which is engaged to the rolling chassis 12 proximate to the handlebar 22. The brake pedal 48 is configured to be depressed by a respective foot of the driver to actuate the rear brakes 46 to slow the rolling chassis 12.

The frame 18 comprises a base 50, which extends from proximate to the rear wheels 16 toward the front wheel 14. The base 50 is rectangularly box shaped and is hollow. A pair of end rails 52 is engaged singly to and extends perpendicularly from a forward end 54 and a rearward end 56 of the base 50. A pair of side rails 58 is engaged to the and extends between the end rails 52 so that an upper panel 60 of the base 50, the side rails 58, and the end rails 52 define a cavity 62. The cavity 62 is configured for insertion of the casket so that the casket is engaged to the rolling chassis 12.

The upper panel 60 is hingedly engaged to a pair of side panels 64 of the base 50 adjacent to the rearward end 56. A lift module 66 is engaged to the rolling chassis 12 and is operationally engaged to the upper panel 60. The lift module 66 is positioned to selectively hinge the upper panel 60. Hinging of the upper panel 60 tilts the casket, as may be desired to allow viewing of a decedent positioned therein.

The lift module 66 comprises a battery 68, a pump 70, and a hydraulic cylinder 72, all of which are engaged to the framework 24. The pump 70 is operationally engaged to the battery 68 so that the battery 68 is positioned to selectively power the pump 70. The hydraulic cylinder 72 is hingedly engaged to and extends between the framework 24 and the upper panel 60. The hydraulic cylinder 72 is operationally engaged to the pump 70 so that the pump 70 is positioned to selectively actuate the hydraulic cylinder 72 to selectively hinge the upper panel 60.

In use, the casket is positioned in the cavity 62 to rest upon the base 50, where it is held in place by the end rails 52 and the side rails 58. The rolling chassis 12 allows the casket to be transported as desired, such as between a location hosting a memorial service and a burial site. The present invention is anticipated to be useful in commemoration of a decedent who enjoyed motorcycling.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A three wheeled hearse assembly comprising:
   a rolling chassis comprising a front wheel and a pair of rear wheels;
   a frame engaged to the rolling chassis between the front wheel and the rear wheels and being configured for positioning therein a casket, such that the casket is engaged to the rolling chassis;
   a seat engaged to the rolling chassis proximate to the front wheel and being configured for seating of a driver;
   a handlebar engaged to the rolling chassis proximate to the front wheel and being operationally engaged thereto, wherein the handlebar is configured for grasping in hands of the driver, positioning the driver selectively turning the front wheel for steering the rolling chassis; and
   wherein the frame comprises:
   a base extending from proximate to the rear wheels toward the front wheel, the base being rectangularly box shaped;
   a pair of end rails engaged singly to and extending perpendicularly from a forward end and a rearward end of the base; and
   a pair of side rails engaged to the and extending between the end rails, such that an upper panel of the base, the side rails, and the end rails define a cavity, wherein the cavity is configured for insertion of the casket, such that the casket is engaged to the rolling chassis.

2. The three wheeled hearse assembly of claim 1, wherein the rolling chassis comprises:
   a framework having engaged to a front end thereof the front wheel and to a rear end thereof the rear wheels;
   a motor engaged to the framework and being operationally engaged to the rear wheels; and
   a gas tank engaged to the framework and being operationally engaged to the motor, such that the gas tank is positioned for fueling the motor.

3. The three wheeled hearse assembly of claim 2, further including the rolling chassis comprising an exhaust pipe engaged to the motor and extending toward the rear end of the framework.

4. The three wheeled hearse assembly of claim 1, further including:
   the base being hollow;
   the upper panel being hingedly engaged to a pair of side panels of the base adjacent to the rearward end; and
   a lift module engaged to the rolling chassis and being operationally engaged to the upper panel, such that the lift module is positioned for selectively hinging the upper panel.

5. The three wheeled hearse assembly of claim 4, wherein the lift module comprises:
   a battery engaged to the framework;
   a pump engaged to the framework and being operationally engaged to the battery, such that the battery is positioned for selectively powering the pump; and
   a hydraulic cylinder hingedly engaged to and extending between the framework and the upper panel, the hydraulic cylinder being operationally engaged to the pump, such that the pump is positioned for selectively actuating the hydraulic cylinder for selectively hinging the upper panel.

6. The three wheeled hearse assembly of claim 2, further including:
the rolling chassis comprising a transmission engaged to the framework and being operationally engaged to the motor and the rear wheels, such that the transmission is positioned for speed and torque conversion between the motor and the rear wheels; and
a clutch pedal engaged to the rolling chassis proximate to the handlebar and being operationally engaged to the transmission, wherein the clutch pedal is configured for being selectively manipulated by a respective foot of the driver for actuating the transmission.

7. A three wheeled hearse assembly comprising:
a rolling chassis comprising a front wheel and a pair of rear wheels;
a frame engaged to the rolling chassis between the front wheel and the rear wheels and being configured for positioning therein a casket, such that the casket is engaged to the rolling chassis;
a seat engaged to the rolling chassis proximate to the front Wheel and being configured for seating of a driver;
a handlebar engaged to the rolling chassis proximate to the front wheel and being operationally engaged thereto, wherein the handlebar is configured for grasping in hands of the driver, positioning the driver selectively turning the front wheel for steering the rolling chassis; and
wherein the rolling chassis comprises:
a framework having engaged to a front end thereof the front wheel and to a rear end thereof the rear wheels;
a motor engaged to the framework and being operationally engaged to the rear wheels; and
a gas tank engaged to the framework and being operationally engaged to the motor, such that the gas tank is positioned for fueling the motor, the transmission and the motor being positioned within a housing engaged to the framework and positioned between the rear wheels.

8. The three wheeled hearse assembly of claim 1, further including a front brake engaged to the front wheel and being operationally engaged to a brake lever engaged to the handlebar, wherein the brake lever is configured for being levered by clutching of the handlebar and the brake lever in a respective hand of the driver for actuating the front brake for slowing the rolling chassis.

9. The three Wheeled hearse assembly of claim 1, further including a pair of rear brakes engaged singly to the rear wheels and being operationally engaged to a brake pedal engaged to the rolling chassis proximate to the handlebar, wherein the brake pedal is configured for being depressed by a respective foot of the driver for actuating the rear brakes for slowing the rolling chassis.

10. A three wheeled hearse assembly comprising:
a rolling chassis comprising a front wheel and a pair of rear wheels, the rolling chassis comprising:
a framework having engaged to a front end thereof the front wheel and to a rear end thereof the rear wheels,
a motor engaged to the framework and being operationally engaged to the rear wheels,
a transmission engaged to the framework and being operationally engaged to the motor and the rear wheels, such that the transmission is positioned for speed and torque conversion between the motor and the rear wheels, the transmission and the motor being positioned within a housing engaged to the framework and positioned between the rear wheels,
a gas tank engaged to the framework and being operationally engaged to the motor, such that the gas tank is positioned for fueling the motor, and
an exhaust pipe engaged to the motor and extending toward the rear end of the framework;
a frame engaged to the rolling chassis between the front Wheel and the rear wheels and being configured for positioning therein a casket, such that the casket is engaged to the rolling chassis, the frame comprising:
a base extending from proximate to the rear wheels toward the front wheel, the base being rectangularly box shaped, the base being hollow,
a pair of end rails engaged singly to and extending perpendicularly from a forward end and a rearward end of the base, and
a pair of side rails engaged to the and extending between the end rails, such that an upper panel of the base, the side rails, and the end rails define a cavity, wherein the cavity is configured for insertion of the casket, such that the casket is engaged to the rolling chassis, the upper panel being hinged y engaged to a pair of side panels of the base adjacent to the rearward end;
a lift module engaged to the rolling chassis and being operationally engaged to the upper panel, such that the lift module is positioned for selectively hinging the upper panel, the lift module comprising:
a battery engaged to the framework,
a pump engaged to the framework and being operationally engaged to the battery, such that the battery is positioned for selectively powering the pump, and
a hydraulic cylinder hingedly engaged to and extending between the framework and the upper panel, the hydraulic cylinder being operationally engaged to the pump, such that the pump is positioned for selectively actuating the hydraulic cylinder for selectively hinging the upper panel;
a seat engaged to the rolling chassis proximate to the front wheel and being configured for seating of a driver;
a handlebar engaged to the rolling chassis proximate to the front wheel and being operationally engaged thereto, wherein the handlebar is configured for grasping in hands of the driver, positioning the driver selectively turning the front wheel for steering the rolling chassis;
a clutch pedal engaged to the rolling chassis proximate to the handlebar and being operationally engaged to the transmission, wherein the clutch pedal is configured for being selectively manipulated by a respective foot of the driver for actuating the transmission;
a front brake engaged to the front wheel and being operationally engaged to a brake lever engaged to the handlebar, wherein the brake lever is configured for being levered by clutching of the handlebar and the brake lever in a respective hand of the driver for actuating the front brake for slowing the rolling chassis; and
a pair of rear brakes engaged singly to the rear wheels and being operationally engaged to a brake pedal engaged to the rolling chassis proximate to the handlebar, wherein the brake pedal is configured for being depressed by a respective foot of the driver for actuating the rear brakes for slowing the rolling chassis.

\* \* \* \* \*